US012236235B2

(12) United States Patent
Hsu

(10) Patent No.: US 12,236,235 B2
(45) Date of Patent: Feb. 25, 2025

(54) SYSTEM AND METHOD FOR EVALUATING SOFTWARE DEVELOPMENT

(71) Applicant: 17LIVE Japan Inc., Tokyo (JP)

(72) Inventor: Yung-Chi Hsu, Taipei (TW)

(73) Assignee: 17LIVE Japan Inc., Tokyo (JP)

(*) Notice: Subject to any disclaimer, the term of this patent is extended or adjusted under 35 U.S.C. 154(b) by 154 days.

(21) Appl. No.: 18/055,710

(22) Filed: Nov. 15, 2022

(65) Prior Publication Data
US 2023/0350672 A1 Nov. 2, 2023

(30) Foreign Application Priority Data

Apr. 28, 2022 (JP) .................................. 2022-074820

(51) Int. Cl.
*G06F 8/77* (2018.01)

(52) U.S. Cl.
CPC ....................................... *G06F 8/77* (2013.01)

(58) Field of Classification Search
None
See application file for complete search history.

(56) References Cited

U.S. PATENT DOCUMENTS

| | | | | |
|---|---|---|---|---|
| 8,005,697 B1* | 8/2011 | Cohen | ..................... | G06Q 30/08 705/7.35 |
| 8,074,119 B1* | 12/2011 | Rao | ..................... | G06F 11/0781 714/48 |
| 11,481,308 B2* | 10/2022 | Keneally | ................. | G06F 17/18 |
| 2007/0203786 A1* | 8/2007 | Nation | ............. | G06Q 10/06398 705/7.42 |
| 2010/0299650 A1* | 11/2010 | Abrahamsen | .......... | G06Q 10/10 717/102 |
| 2013/0311968 A1* | 11/2013 | Sharma | ............... | G06F 11/3692 717/101 |
| 2015/0019564 A1* | 1/2015 | Higginson | ................ | G06F 8/65 707/748 |
| 2016/0292013 A1* | 10/2016 | Li | ......................... | G06F 9/4881 |
| 2018/0247273 A1* | 8/2018 | Tamma | ............. | G06Q 10/1095 |

(Continued)

FOREIGN PATENT DOCUMENTS

| | | |
|---|---|---|
| CN | 109815220 A | 5/2019 |
| JP | 6-28040 B2 | 4/1994 |

OTHER PUBLICATIONS

Badshah, "Performance-based service-level agreement in cloud computing to optimise penalties and revenue", 2020, IET (Year: 2020).*

(Continued)

*Primary Examiner* — Hossain M Morshed
(74) *Attorney, Agent, or Firm* — Pillsbury Winthrop Shaw Pittman, LLP

(57) ABSTRACT

The subject application relates to a system and method for evaluating software development and includes selecting a plurality of parameters and calculating product achievement rate according to the parameters. In this method, the parameters include bug-fixed score and at least one of the following scores: SLO-enhancement score, on-time score and stability score. According to the subject application, it is possible to evaluate the project achievement in a more accurate way, and it could motivate the software engineers to make the software better and therefore the software development may be improved.

8 Claims, 8 Drawing Sheets

(56) References Cited

U.S. PATENT DOCUMENTS

2019/0139332 A1* 5/2019 Antonsson ............... G06F 8/77

OTHER PUBLICATIONS

Marks, "Studying the Fix-Time for Bugs in Large Open Source Projects", 2011, ACM (Year: 2011).*
Deora, "Quality, Timeliness and Reliability in Software Medical Devices-Experience", 2013, IEEE (Year: 2013).*
Al-Masri, "QoS-based Discovery and Ranking of Web Services", 2007, IEEE (Year: 2007).*
Notification of Reasons for Refusal dated Oct. 25, 2022, issued in corresponding Japanese Patent Application No. 2022-074820 with English translation (4 pgs.).

* cited by examiner

| SLO | Sprint 1 | Sprint 2 | Sprint 3 | ... |
|---|---|---|---|---|
| 99.6% | 99.7% | 99.9% | | |
| ... | ... | ... | ... | |

FIG. 3

| bugs | P0 | P1 | P2 | P3 | Total |
|---|---|---|---|---|---|
| Sprint 1 | 0 | 1 | 58 | 192 | 251 |
| Sprint 2 | 0 | 0 | 62 | 181 | 243 |
| ... | ... | ... | ... | ... | ... |

FIG. 4

| | Target Release Date | Actual Release Date | Release Day - Target Date |
|---|---|---|---|
| Sprint 1 | 2022/1/6 | 2022/1/6 | 0 |
| Sprint 2 | 2022/1/20 | 2022/1/20 | 0 |
| ... | ... | ... | ... |

FIG. 5

| | | | | | SLO Enhancement | |
|---|---|---|---|---|---|---|
| Weighting | 0.4 | Period | 7 days | ENG Index (Original) 100% | ENG Index (Needed) 100% | 100% |
| Weighting | 0.1 | Target Date | | Release Date 2022/1/16 | Release Day - Target Date 0 | On Time Score 100% |
| Weighting | 0.3 | | | P0 1 | P0 0 | Stability Score 30% |
| Weighting | 0.2 | Incident in 7 day/P1 | | Number of jira (Expected) 225 | Number of jira 7 days increase (Number of rate) 0 | CS Jira Bug Fixed Score 200.00% |
| Extra Bouns | | | 0.00 | | 5 | Product Achievement rate 89% |
| Base Criteria | | Real | 5.00 | | 5 | 200.00% |
| Under Budget | Median | | | | 10 | -53.33% |
| Over Budget | Median | | | | | |
| Extra Bonus | Median | | | | 30 | 0.00% |

FIG. 8

SYSTEM AND METHOD FOR EVALUATING SOFTWARE DEVELOPMENT

CROSS-REFERENCE TO RELATED APPLICATIONS

This application is based on and claims the benefit of priority from Japanese Patent Application Serial No. 2022-074820 (filed on Apr. 28, 2022), the contents of which are hereby incorporated by reference in its entirety.

TECHNICAL FIELD

This disclosure relates to information and communication technology, and in particular, to a system and method for evaluating software development.

BACKGROUND

In order to determine product achievement, there are a lot of methods for evaluating software development such as Patent Document 1 and 2 as below. However, the current method could not reflect the real situation perfectly. Moreover, the result of these methods is mainly for reference and there is no motivation for the software engineers to make the software better.

In addition, the prior art evaluation method as disclosed in Patent Documents 1 and 2 targets water-fall type software development and does not work well with agile development. In agile development, inter-sprint correlation is strong; however, the prior art method does not take such correlation into account. So it does not work well.

Therefore, a more efficient and new evaluation method suitable for evaluating agile development is necessary.

[Patent Document 1]: JPH06-28040
[Patent Document 2]: CN109815220A

SUMMARY

An embodiment of subject application relates to a method for evaluating software development, comprising: at a device including one or more processors, non-transitory memory and one or more input devices: selecting a plurality of parameters; calculating product achievement rate according to the parameters; wherein the parameters include bug-fixed score and at least one of the following scores: SLO-enhancement score, on-time score and stability score.

Another embodiment of subject application relates to a system for evaluating software development, comprising: a parameter selecting unit configured to select a plurality of parameters; a calculating unit configured to calculate product achievement rate according to the parameters; wherein the parameters include bug-fixed score and at least one of the following scores: SLO-enhancement score, on-time score and stability score.

Another embodiment of subject application relates to a non-transitory computer-readable medium storing one or more programs for causing a user terminal to realize the functions of: causing a plurality of parameters to be selected; causing product achievement rate to be calculated according to the parameters; wherein the parameters include bug-fixed score and at least one of the following scores: SLO-enhancement score, on-time score and stability score.

According to the present disclosure, it is possible to evaluate the project achievement in a more accurate way, and it could motivate the software engineers to make the software better and therefore the software development may be improved.

BRIEF DESCRIPTION OF THE DRAWINGS

FIG. 3 shows an exemplary data structure of the SLO DIB 106 in FIG. 1;

FIG. 4 shows an exemplary data structure of the bug info DB 108 in FIG. 1;

FIG. 5 shows an exemplary data structure of the release info DB 110 in FIG. 1;

FIG. 8 is an exemplary GUI 500 of the product achievement evaluation system 1 according to some embodiments of subject application;

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

This disclosure may be a method and system for evaluating development suitable for agile development of software. In software development, agile project management is a popular way to manage the project. Scrum is a famous and popular framework for developing, delivering, and sustaining products in a complex environment. In Scrum, each team's work is broken into goals with completion within time-boxed iterations, which is called sprints.

The sprint is the basic unit of development and is normally between one week and one month, with two weeks being the most common. The more difficult the feature is, the more sprints are required to complete the work. Generally, new features are always released after one sprint is completed and before another sprint gets started. In addition, the subject application exploits the fact that each sprint may have its own release.

Before the feature release, it counts on each team's effort to complete the tasks on-time to meet the release date. After the feature release, it counts on the overall performance of the software, service or APP to guarantee the quality of the service. Therefore, parameters before and after the feature release need to be taken into consideration. In particular, the subject application considers parameters suitable for agile development and the results/parameters of the last sprint may be incorporated into evaluation of the current sprint.

Therefore, the product achievement evaluation system 1 according to some embodiments of subject application provides enhancement on the evaluation of the project achievement.

Figure 1:
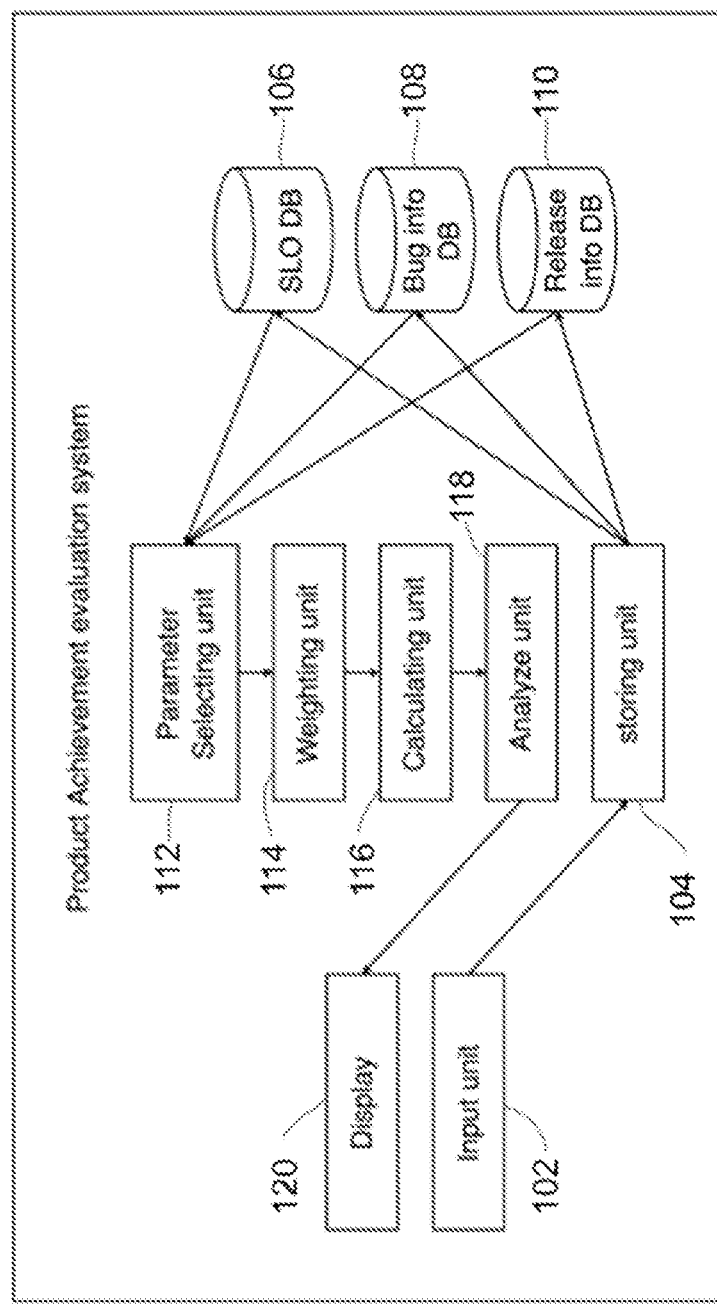
FIG. 1 is a schematic block diagram of the product achievement evaluation system 1 according to some embodiments of subject application.

FIG. 1 is a schematic block diagram of the product achievement evaluation system 1 according to some embodiments of subject application. The blocks depicted in the block diagram of this specification are implemented in hardware such as devices like a CPU of a computer or mechanical components, and in software such as a computer program depicts functional blocks implemented by the cooperation of these elements. Therefore, it will be understood by those skilled in the art that the functional blocks may be implemented in a variety of manners by a combination of hardware and software.

As shown in FIG. 1, the product achievement evaluation system 1 may include an input unit 102, storing unit 104, SLO DB 106, bug info DB 108, release info DB 110, parameter selecting unit 112, weighting unit 114, calculating unit 116, analyze unit 118, and display 120.

The input unit 102 is configured to receive input. In some embodiments, the input may be received manually such as by key-in the data and values. In some embodiments, the input unit 102 may be a mouse, a keyboard, a touch panel or the like. For example, the data and values may be entered manually by using the keyboard and mouse.

In some embodiments, the input may be received automatically by extracting the values of the parameters from a monitoring unit. For example, there may be a monitoring unit configured to monitor the value of SLO to guarantee the quality of the server. The input unit 102 may extract the value of SLO from the monitoring unit automatically.

The storing unit 104 is connected to the input unit 102 and is configured to store the input to a corresponding database. The input unit 102 may receive a variety of parameters as input and then be configured to classify the parameters and store them to an appropriate database respectively. In some embodiments, the storing unit 104 may be directly connected to the parameter selecting unit 112 described later to accelerate the retrieval of the parameters.

The SLO DB 106 is configured to store the value of service level indicators (SLIs). The SLI may be referred to as the measurements for quality of service (QoS). The SLO may be referred to as the level a service is expected to achieve over a specific period.

For example, the SLO may be defined as that 99% of the API request must be responded in less than 300 msec over a one-month period. For this SLO, the SLI may be reported as a percentage of time that the target response time was achieved and then compared to the desired service level (99%).

In some embodiments, the SLIs may include availability, service desk response, incident response time, API response time, latency, ANR free rate or the like. In some embodiments, the SLIs and SLOs may be determined or defined according to the practical need.

Figure 3:
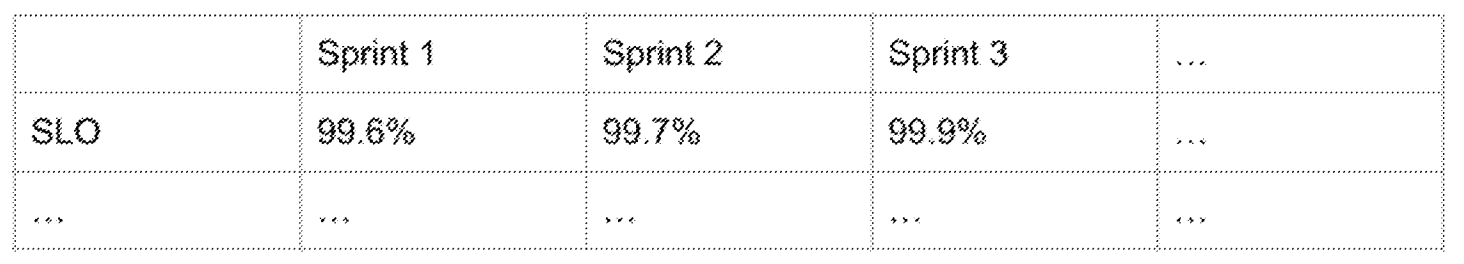

FIG. 3 shows an exemplary data structure of the SLO DB 106 in FIG. 1. The SLO DB 106 associatively stores value of the SLI identifying the performance of the software, service or APP or the like. As shown in FIG. 3 the value of the SLI may be calculated and stored sprint by sprint.

The bug info DB 108 is configured to store the information of bugs in the software. FIG. 4 shows an exemplary data structure of the bug info DB 108 in FIG. 1. The bug info DB 108 associatively stores the information of bugs identifying the total number of bugs and the number of bugs in each priority such as P0, P1, P2 and P3. As shown in FIG. 4 the information of bugs may also be calculated and stored sprint by sprint.

The release info DB 110 is configured to store the information of release for the software. FIG. 5 shows an exemplary data structure of the release info DB 110 in FIG. 1. The release info DB 110 associatively stores the information of release identifying the target release date, actual release date or the like. In some embodiments, the release info DB 110 may calculate the delay of the feature release according to the subtraction of the target release date and actual release date. In some embodiments, the release info DB 110 may store the delay of the feature release as shown in FIG. 5.

In some embodiments, the value of parameters may be calculated and stored sprint by sprint. In some embodiments, the value may also be calculated in the beginning of each sprint, in the middle of each sprint or in the end of each sprint. In some embodiments, the value may also be calculated by averaging the value during a sprint. In some embodiments, the value may also be calculated by day, week, month, quarter, year or the like. In some embodiments, the value may also be calculated according to the length of a sprint.

The parameter selecting unit 112 is configured to select parameters and retrieve the value of the parameters from corresponding databases or the like. The parameter selecting unit 112 may select one or more parameters to be used for evaluating the product achievement rate. In some embodiments, the parameter selecting unit 112 may select parameters manually or automatically. In some embodiments, the parameter selecting unit 112 may select parameters based on a machine learning model or any other technical means. In some embodiments, the parameter selecting unit 112 may select parameters according to the historical data or real-time data in a dynamic manner.

The weighting unit 114 is connected to the parameter selecting unit 112 and is configured to determine weightings for each parameter. In some embodiments, it is optional for the weighting unit 114 to determine the weightings. In some embodiments, the weighting unit 114 may determine the weighting equally or according to the importance of each parameter. In some embodiments, the weighting unit 114 may determine weightings manually or automatically. In some embodiments, the weighting unit 114 may determine weightings based on a machine learning model or any other technical means. In some embodiments, the weighting unit 114 may determine weightings according to the historical data or real-time data in a dynamic manner.

The calculating unit 116 is configured to calculate the product achievement based on the parameters and weightings from the parameter selecting unit 112 and the weighting unit 114. In some embodiments, the calculating unit 116 may set a range such as maximum and/or minimum for each parameter or score in order to prevent some parameters with extreme value from destroying the accuracy of the product achievement rate.

The analyze unit 118 is connected to the calculating unit 116 and is configured to receive and analyze the result from the calculating unit 116. The analyze unit 118 may determine whether the product achievement is good, normal or bad according to the result from the calculating unit 116. In some embodiments, the analyze unit 118 may further display the result and the analysis on the display 120 as shown in FIG. 1.

Figure 2:
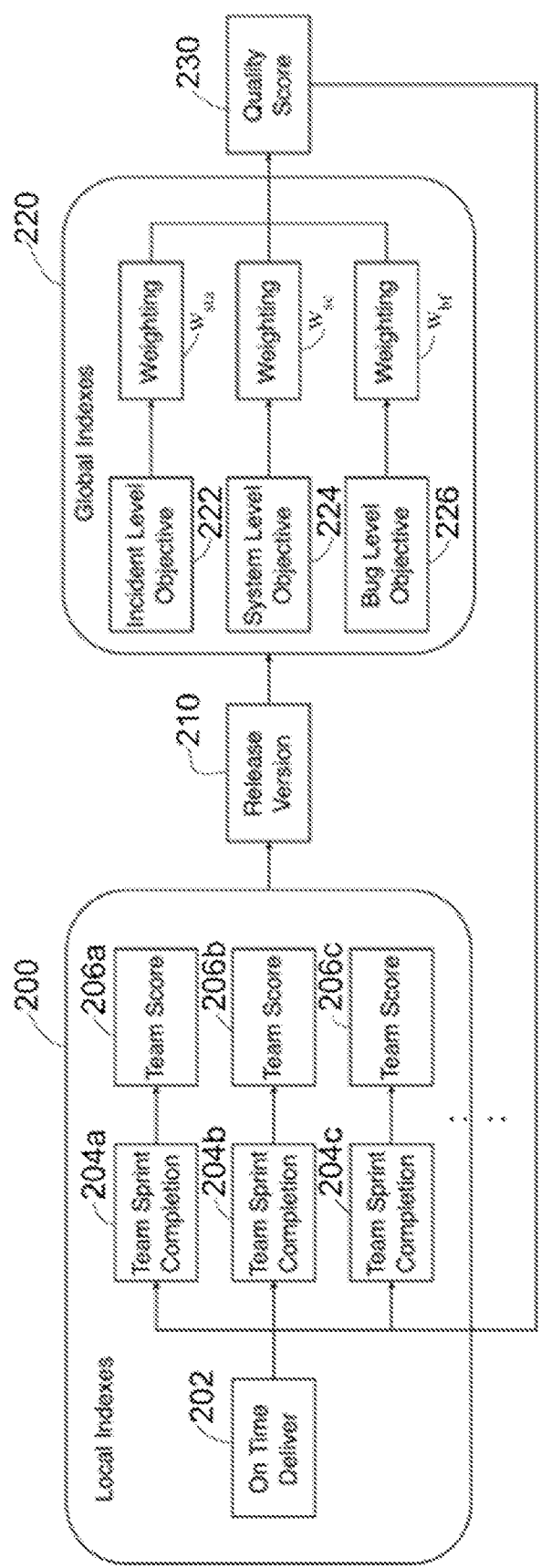
FIG. 2 is a conceptual diagram for explaining the product achievement evaluation system 1 according to some embodiments of subject application.

FIG. 2 is a conceptual diagram for explaining the product achievement evaluation system 1 according to some embodiments of subject application. In some embodiments, the parameters may be classified into local indexes 200 and global indexes 220. The local indexes 200 may be referred to as the parameters relating to each team respectively. The global indexes 220 may be referred to as the parameters relating to the overall project or software development.

In some embodiments, the local indexes 200 may include the on-time score OT or the like. In some embodiments, the global indexes 220 may include the stability score STA, bug-fixed score BF, SLO-enhancement score SE or the like.

The on-time score OT may be a score to evaluate the punctuality of a feature release, or more specifically the delay of a feature release. The stability score STA may be a score to evaluate the stability of a service or software. The bug-fixed score BF may be a score to evaluate the number of bugs to be fixed in a service or software. The SLO-enhancement score may be a score to evaluate the enhancement of the SLO in a service or software. In some embodiments, the above parameters may be expressed as a percentage calculated by specific variables, which would be described later. In some embodiments, the above parameters may be expressed according to the practical need.

In some embodiments, a release version 210 may be positioned between the local indexes 200 and global indexes 220. The release version 210 may be the time point of releasing a new feature on a software or APP, which may also be referred to as a new version of software or APP. In some embodiments, that each sprint has its own release is predicted.

In some embodiments, the parameters to be considered before the release version 210 may be referred to as the local indexes 200, and that after the release version 210 may be referred to as the global indexes 220. More specifically, since the evaluation of the software before the release version 210 counts on the efforts from each team and that after the release version 210 counts on the performance of the software or service, the parameters to be considered may be divided into local indexes 200 and global indexes 220 by the release version 210.

In some embodiments, the local indexes 200 may include parameters such as the on-time deliver 202. The on-time deliver 202 may be the parameter to determine whether the feature release is on-time or not. In some embodiments, the reason for the feature release being on-time or not may be the sprint completion rate for each team or whether each team completes their tasks on-time or not.

In some embodiments, the feature release may be earlier, on-time or later than a predetermined date. In some embodiments, the on-time score OT may be used to evaluate the degree of the on-time deliver 202. In some embodiments, the formula of the on-time score OT may be like the following:

$$OT = 1 - (D_{release} - D_{target}) * 0.1 \quad (1)$$

The variables of $D_{release}$ may be the actual release date and $D_{target}$ may be the target release date. According to the formula (1), the on-time score OT may be 1 if the feature release is on-time, which means that the actual release date is the same as the target release date. In some embodiments, the on-time score OT may be lower than 1 if the feature release is delayed, and vice versa. For example, the on-time score OT may be decreased by a decrement of 0.1 if the feature release is delayed by 1 day.

In some embodiments, the global indexes 220 may include parameters such as the incident level objective 222, system level objective 224, bug level objective 226 or the like. The incident level objective 222 may be the parameter to determine the incident level of the release version.

In software development, the software bug may be referred to as an error, flaw or fault in computer software that causes it to produce an incorrect or unexpected result, or to behave in unintended ways. The bugs may be classified as P0, P1, P2, P3 or P4 according to the priority to be solved. Especially, the bugs with high priority such as P0 and P1, which would disrupt operational processes and cause the software to become outage or critical, may be considered as an incident in the software. Therefore, the incident level is an important parameter to evaluate the product achievement.

In some embodiments, the stability score STA may be used to evaluate the degree of the incident level objective 222. In some embodiments, the formula of the stability score STA may be like the following:

$$STA = 1 - ((1 * B_{P0}) + (0.7 * B_{P1})) \quad (2)$$

The variables of $B_{P0}$ may be the number of P0 bugs and $B_{P1}$ may be the number of P1 bugs. According to the formula (2), the stability score STA may be 1 if there are no P0 or P1 bugs in the version release. In some embodiments, the stability score STA may be lower than 1 if there are any P0 or P1 bugs, and vice versa. For example, the stability score STA may be decreased by 1 if a P0 bug occurs, and the stability score STA may be decreased by 0.3 if a P1 bug occurs. In some embodiments, the coefficients such as 1 and 0.7 may be adjusted according to practical need.

One of the technical advantages of this embodiment is that if an incident occurs in seven days and is also solved in seven days, the incident will not contribute to the stability score STA and the overall product achievement rate, which may also motivate the engineers to solve the incidents as quickly as possible.

System level objective 224 may be the parameter to determine the service level of the release version. Service level is an important metric for measuring the performance of the service provider. In some embodiments, the SLO-enhancement score SE may be used to evaluate the degree of the system level objective 224. In some embodiments, the formula of the SLO-enhancement score SE may be like the following:

$$SE = 1 - (SLO_{original} - SLO_{7th}) \quad (3)$$

The variable of $SLO_{original}$ may be the value of SLI at the time point of release and $SLO_{7th}$ may be the value of the SLI at the 7th day after the time point of release. According to the formula (3), the SLO-enhancement score SE may be 1 if the SLI keeps the same during the seven days. In some embodiments, the SLO-enhancement score may be lower than 1 if the SLI decreases during the seven days, and vice versa. For example, the stability score STA may be decreased by 0.1% if the SLI decreases 0.1% during the seven days.

The bug level objective 226 may be the parameter to determine the bug level of the release version. In some embodiments, the bug level may be referred to as the number of total bugs in a software or APP. As described above, the bugs may be classified according to the priority. Although the bugs with low priority are not urgent to be solved, the existence of any bugs may be a possibility to cause the software to become abnormal. Therefore, the bug level objective 226 is also an important parameter to evaluate the product achievement.

In some embodiments, the bug-fixed score BF may be used to evaluate the degree of the bug level objective 226.

In some embodiments, the formula of the bug-fixed score BF may be like the following:

$$BF = 1 - ((B_{7th} - B_{expected})/(B_{expected} - B_{release})) \quad (4\text{-}1)$$

$$B_{expected} = B_{release} + BI_{predicted} \quad (4\text{-}2)$$

The variable of $B_{release}$ may be the number of total bugs at the time point of release, $B_{7th}$ may be the number of total bugs at the 7th day after the time point of release, and $B_{expected}$ may be the predicted number of total bugs at the 7th day after the time point of release.

The $B_{expected}$ may be the sum of $B_{release}$ and the predicted bug increase $BI_{predicted}$. The predicted bug increase $BI_{predicted}$ may be referred to as the number of bugs predicted to increase in one feature release. For each feature release, it is unavoidable to have extra bugs occurs. Therefore, the predicted bug increase $BI_{predicted}$ may be referred to as a tolerance number of bugs for each feature release.

In some embodiments, the predicted bug increase $BI_{predicted}$ may be determined manually, automatically or by any other possible method. In some embodiments, the predicted bug increase $BI_{predicted}$ may be a constant number for each release such as 3, 5, 7 or the like. In some embodiments, the predicted bug increase $BI_{predicted}$ may be a variable and changed based on each feature release. In some embodiments, the predicted bug increase $BI_{predicted}$ may be determined based on the complexity of the feature to be released. In some embodiments, the predicted bug increase $BI_{predicted}$ may be determined according to the practical need.

According to the formula (4-1) and formula (4-2), the bug-fixed score BF may be 1 if the number of total bugs is the same as the predicted number of total bugs at the 7th day after the time point of release, which means that $B_{7th}$ equals to $B_{expected}$. In some embodiments, the bug-fixed score BF may be lower than 1 if there are more bugs than the predicted bug increase $BI_{predicted}$ occurs during the seven days, and vice versa. For example, the bug-fixed score BF may be decreased by a specific percentage if more bugs than the predicted bug increase $BI_{predicted}$ occurs.

Referring to FIG. 2, the incident level objective 222, system level objective 224 and bug level objective 226 may have weightings $w_{sta}$, $w_{se}$ and $w_{bf}$ respectively. In some embodiments, the quality score 230 may be calculated according to the local indexes 200 and the global indexes 220. In some embodiments, the quality score 230 may be referred to as the overall product achievement rate $PA_{overall}$. In some embodiments, the overall product achievement rate $PA_{overall}$ may be evaluated according to the on-time score OT, stability score STA, SLO-enhancement score SE and bug-fixed score BF. In some embodiments, the formula for calculating the overall product achievement rate $PA_{overall}$ may be like the following:

$$PA_{overall} = w_{se}*SE + w_{ot}*OT + w_{sta}*STA + w_{bf}*BF$$

The $w_{se}$, $w_{ot}$, $w_{sta}$, and $w_{bf}$ may be the weightings for each score respectively. In some embodiments, the weightings for each parameter may be optional. In some embodiments, the weightings may be determined equally or differently according to the importance of each parameter.

In some embodiments, the weighting $w_{se}$ for the SLO-enhancement score SE may have the largest weighting and the weighting $w_{ot}$ for the on-time score OT may have the smallest weighting among the four parameters above. For example, the $w_{se}$, $w_{ot}$, $w_{sta}$ and $w_{bf}$ may be 0.4, 0.1 0.3 0.2 respectively. In some embodiments, the sum of the weightings may be 1. However, the weightings and the sum of the weightings may be adjusted flexibly according to the practical need.

As described above, the bug-fixed score BF may be higher than 1 if the bugs are solved in time to make the number of total bugs lower than the predicted number of total bugs at the 7th day after the time point of release, which means that making $B_{7th}$ being lower than $B_{expected}$.

For example, the bug-fixed score BF may be increased by a specific percentage if bugs are solved. One of the technical advantages of this embodiment is that it could motivate the engineers to solve the existing or newly found bugs in the software or APP in order to achieve a high product achievement rate. For example, if the release version encounters an P1 bug, which causes the stability score STA to decrease by 0.3, one way to increase the overall product achievement rate $PA_{overall}$ may be to solve bugs.

Moreover, if the total number of bugs becomes lower and lower, the possibility of occurring incidents may be lower and the stability of the software or service may become better, which means that the incident level objective 222, system level objective 224 and bug level objective 226 may be significantly improved.

In some embodiments, the $B_{expected}$ may further include a bonus $B_{bonus}$ contributed from the previous sprint. More specifically, the $B_{expected}$ and $B_{bonus}$ may be calculated like the following:

$$\text{In sprint } n+1: B_{expected} = B_{release} + BI_{predicted} + B_{bonus} \quad (5\text{-}1)$$

$$\text{In sprint } n: B_{bonus} = BI_{predicted} - BI_{actual} \quad (5\text{-}2)$$

n is a positive integer

According to the formula (5-1) and (5-2), the bonus $B_{bonus}$ may be added to the $B_{expected}$ in the following sprint and the bonus $B_{bonus}$ may be calculated according to the parameters from the previous sprint. According to the formula (5-2), the $B_{bonus}$ may be 0 if the predicted bug increase $BI_{predicted}$ equals the actual bug increase $BI_{actual}$ during seven days, which means that no bonus $B_{bonus}$ would contribute to the following sprint if the actual bug increase $BI_{actual}$ is the same as the predicted bug increase $BI_{predicted}$. In some embodiments, the $B_{bonus}$ may also contribute to the current sprint.

In some embodiments, the $B_{bonus}$ may be higher than 0 if the actual bug increase $BI_{actual}$ is lower than the predicted bug increase $BI_{predicted}$, which means there is less bug occurred than prediction. For example, if the actual bug increase is two smaller than prediction, the bonus $B_{bonus}$ for 2 may be contributed to the $B_{expected}$ in the next sprint. One of the technical advantages of this embodiment is that it motivates the engineers to provide better feature release with fewer bugs.

In some embodiments, the formula above may be adjusted manually, automatically or according to any machine learning method. In some embodiments, a period of seven days is used to evaluate the tendency of some parameters after version release. However, the period may also be determined flexibly. In some embodiments, the period may also be determined according to the length of a sprint. the period may also be determined such as three, five, ten days or the like. In some embodiments, the parameters, variables or coefficients in the formula may be determined flexibly according to the practical need. In some embodiments, the formula above may be adjusted according to the practical need.

In some embodiments, the product achievement rate for each team may also be calculated according to the overall product achievement rate $PA_{overall}$. As shown in FIG. 2, the local indexes 200 may further include the team sprint completion 204a, 204b, 204c and team score 206a, 206b, 206c respectively for each team. The team sprint completion 204a, 204b, 204c may be referred to as the completion rate for each team in one sprint. In some embodiments, the completion rate may be referred to as the percentage of the completed tasks over the total tasks. The team score 206a, 206b, 206c may be referred to as the product achievement rate for each team $PA_{team}$. In some embodiments, the formula of the $PA_{team}$ may be like the following:

$$PA_{team}=C_{team}*PA_{overall}-((1-OT_{team})*w_{ot\text{-}team}) \quad (6\text{-}1)$$

$$OT_{team}=1-D_{delay}*0.1 \quad (6\text{-}2)$$

$$D_{delay}=D_{actual}-D_{target} \quad (6\text{-}3)$$

The variables of $C_{team}$ may be the completion rate for each team, $OT_{team}$ may be the on-time score for each team, and $D_{delay}$ may be the delay day for each team. According to the formula (6-2), the on-time score for each team $OT_{team}$ may be 1 if the task for each team is completed on-time. In some embodiments, the $OT_{team}$ may be lower than 1 if the task for each team is delayed, and vice versa. For example, the on-time score $OT_{team}$ may be decreased by a decrement of 0.1 if the feature release is delayed by 1 day.

According to the formula (6-3), the delay day for the team $D_{delay}$ may be determined by the difference of the actual completion date $D_{actual}$ and the target completion date $D_{target}$.

Moreover, the on-time score for each team $OT_{team}$ may have a weighting $w_{ot\text{-}team}$ to emphasize the importance of task completion on-time. The weighting $w_{ot\text{-}team}$ may be determined flexibly such as 0, 1, 2 or more. If the weighting $w_{ot\text{-}team}$ is zero, then the product achievement rate for each team $PA_{team}$ may be determined by $C_{team}$ times $PA_{overall}$. In some embodiments, the weighting $w_{ot\text{-}team}$ may be determined according to the practical need.

In some embodiments, the product achievement rate for each team $PA_{team}$ may be calculated according to parameters such as $PA_{overall}$, $C_{team}$, $OT_{team}$ or the like. In some embodiments, the product achievement for overall division may be calculated according to the product achievement rate for each team $PA_{team}$. For example, the product achievement for overall division may be calculated by averaging the product achievement rate for each team $PA_{team}$. In some embodiments, not all teams are included in one feature release, so the score for the teams not involved in may show zero and not contribute to the calculation of the product achievement for overall division.

In some embodiments, the product achievement evaluation system 1 may set a range for each parameter, variable or bonus. More specifically, a maximum and/or minimum may be predetermined for each parameter, variable or bonus. For example, the SLO-enhancement score may have a minimum score around 30%, 50%, 80% or the like. If the SLO-enhancement score is below the minimum score, the SLO-enhancement score may be replaced with the minimum score. For another example, the bug-fixed score BF may have a maximum score around 200%, 300%, 500%, 800%, 1000% or the like. Therefore, the overall product achievement rate will be not affected by some parameters strongly and the accuracy of the overall product achievement rate would be better.

In some embodiments, parameter(s) may be selected and combined to calculate the product achievement rate according to the practical need. For example, the bug-fixed score BF may be combined with the SLO-enhancement score SE to calculate the product achievement rate. In some embodiments, the bug-fixed score BF may be combined with the on-time score OT to calculate the product achievement rate. In some embodiments, the bug-fixed score BF may be combined with the stability score STA to calculate the product achievement rate. If the bug-fixed score BF is the only parameter to be considered, it may cause the engineers to solve the simplest bugs in order to increase the product achievement rate quickly, which would cause the performance of the software or service to become worse and worse.

Figure 6:
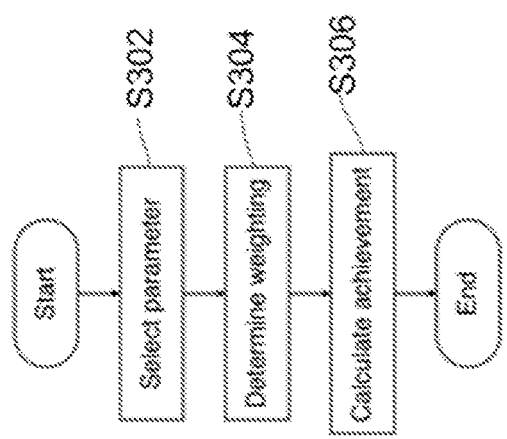
FIG. 6 is an exemplary sequence chart illustrating an operation of the configuration of the product achievement evaluation system 1 according to some embodiments of subject application.

FIG. 6 is an exemplary sequence chart illustrating an operation of the configuration of the product achievement evaluation system 1 according to some embodiments of subject application. In step S302, the parameter selecting unit 112 may select parameters and retrieve the data or value from the corresponding database. In step S304, the weighting unit 114 may determine the weightings for each parameter. In step S306, the calculating unit 116 may calculate the product achievement rate according to the parameters and weightings.

Figure 7:
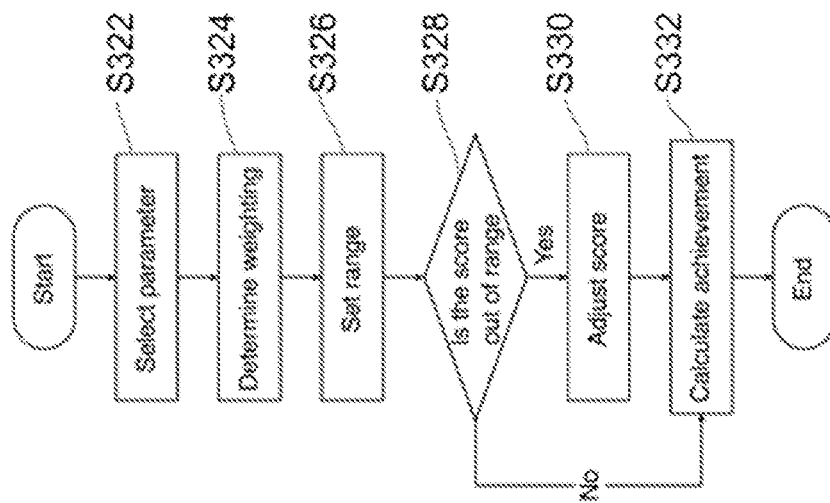
FIG. 7 is an exemplary sequence chart illustrating an operation of the configuration of the product achievement evaluation system 1 according to some embodiments of subject application.

FIG. 7 is an exemplary sequence chart illustrating an operation of the configuration of the product achievement evaluation system 1 according to some embodiments of subject application. In step S322, the parameter selecting unit 112 may select parameters and retrieve the data or value from the corresponding database. In step S324, the weighting unit 114 may determine the weightings for each parameter. In step S326, the calculating unit 116 may set ranges for each parameter, score or bonus. In step S328, the calculating unit 116 may check if the parameter, score or bonus is out of the range. If any scores are out of the range (Yes in step S328), the calculating unit 116 may adjust the score automatically to fit the range. If no score is out of the range (No in step S328), the calculating unit 116 may calculate the product achievement rate according to the parameters and weightings.

FIG. 8 is an exemplary GUI 500 of the product achievement evaluation system 1 according to some embodiments of subject application. As shown in the FIG. 8, the GUI 500 of the product achievement evaluation system 1 may include parameter region 502, variable region 504, weighting region 506, product achievement rate region 508, bonus region 510.

In the parameter region 502, it may show the indexes of the parameters and their corresponding score. In the variable region 504, it shows the variables of the parameters and their corresponding value. In the weighting region 506, it may show the weightings for each corresponding parameter. In the product achievement rate region 508, it may show the product achievement rate, which may be calculated according to the above parameters, variables and weightings. In the bonus region 510, it may show the bonus according to the above parameters and variables. For example, the bonus region 510 may include the base criteria for the predicted bug increase $BI_{predicted}$, real for the actual bug increase $BI_{actual}$ and extra bonus, which may be calculated according to the difference of the $BI_{predicted}$ and $BI_{actual}$. In some embodiments the extra bonus may contribute to the following sprint or the like.

Figure 9:
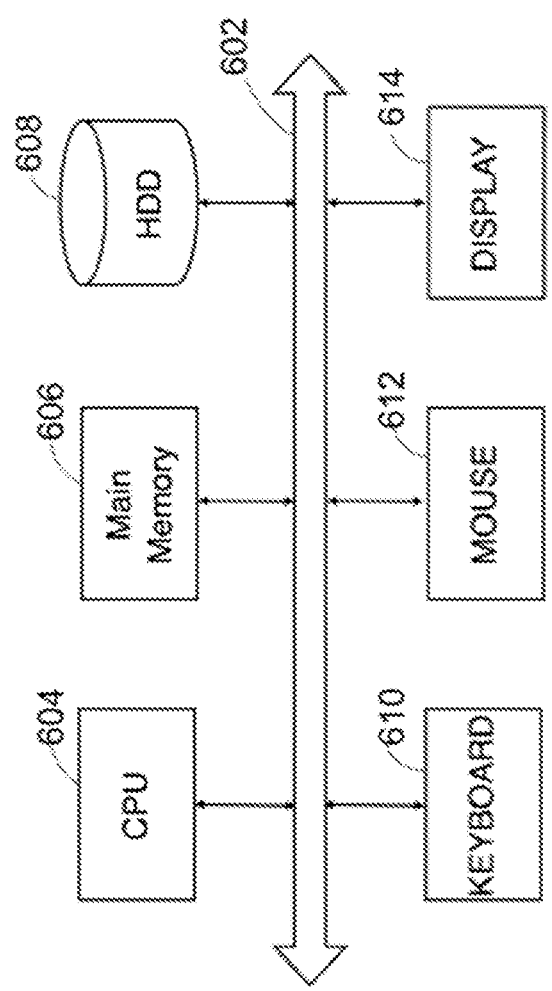
FIG. 9 is a schematic block diagram of computer hardware for carrying out a system configuration and processing according to some embodiments of subject application.

FIG. 9 is a schematic block diagram of computer hardware for carrying out a system configuration and processing according to some embodiments of subject application. In FIG. 9, a CPU 604, a main memory 606, a HDD (hard disk drive) 608, a keyboard 610, a mouse 612 and a display 614 are connected to a system bus 602. The CPU 604 is preferably based on a 32-bit or 64-bit architecture. The main memory 606 preferably has a capacity of 2 GB or more.

The hard disk drive 608 preferably has a capacity of 200 GB or more. In some embodiments, the hard disk drive 608 stores an operating system, past project information, current project information to be analyzed and processing programs according to the subject application. The operating system may be an arbitrary one compatible with the CPU 604, such as Linux, Windows series by Microsoft Corporation and Mac OS by Apple Computer.

Moreover, the hard disk drive 608 may also store an arbitrary programming language processor such as C, C++, C# and Java (trademark) or the like. This programming language processor is used to create and retain processing programs according to the subject application. In some embodiments, the hard disk drive 608 may further include a text editor for writing source codes to be compiled by the programming language processor and a development environment.

The keyboard 610 and the mouse 612 are used to initiate the operating system or a program (not shown), which are loaded into the main memory 606 from the hard disk drive 608 and displayed on the display 614, and to type characters. The display 614 is preferably a liquid crystal display, and one having an arbitrary resolution can be used. The display 614 is used to display a result of processing according to the subject application.

Furthermore, the system and method described in the above embodiments may be provided with a computer-readable non-transitory storage device such as a solid-state memory device, an optical disk storage device, or a magnetic disk storage device. Alternatively, the programs may be downloaded from a server via the Internet.

Although technical content and features of the present invention are described above, a person having common knowledge in the technical field of the present invention may still make many variations and modifications without disobeying the teaching and disclosure of the present invention. Therefore, the scope of the present invention is not limited to the embodiments that are already disclosed, but includes another variation and modification that do not disobey the present invention, and is the scope covered by the following patent application scope.

LIST OF REFERENCE NUMBERS

1 Product achievement evaluation system
102 Input unit
104 Storing unit
106 SLO DB
108 Bug info DB
110 Release info DB
112 Parameter selecting unit
114 Weighting unit
116 Calculating unit
118 Analyze unit
120 Display
200 Local indexes
202 On-time deliver
204a, 204b, 204c Team sprint completion
206a, 206b, 206c Team score
210 Release version
220 Global indexes
222 Incident level objective
224 System level objective
226 Bug level objective
230 Quality score
502 Parameter region
504 Variable region
506 Weighting region
508 Product achievement rate region
510 Bonus region
602 System bus
604 CPU
606 Main memory
608 Hard disk drive (HDD)
610 Keyboard
612 Mouse
614 Display
S302, S304, S306, Step
S322, S324, S326,
S328, S330, S332

What is claimed is:

1. A method for evaluating software development, comprising:
at a device including one or more processors, non-transitory memory and one or more input devices:
selecting a plurality of parameters;
calculating overall product achievement rate according to the parameters;
obtaining completion rate for each team and on-time score for each team; and
calculating team product achievement rate for each team according to the completion rate for each team, the on-time score for each team and the overall product achievement rate, wherein
the parameters include bug-fixed score and at least one of the following scores: SLO-enhancement score, the on-time score and stability score.

2. The method for evaluating software development according to claim 1, wherein:
the bug-fixed score is a score to evaluate the number of bugs to be fixed; the SLO-enhancement score is a score to evaluate the enhancement of the SLO; the on-time score is a score to evaluate the punctuality of a feature release; and the stability score is a score to evaluate the stability of a service or software.

3. The method for evaluating software development according to claim 1, further comprising:
determining weighting for each parameter;
setting range for each parameter; and
calculating the overall product achievement rate according to the parameters, weightings and ranges.

4. The method for evaluating software development according to claim 1, further comprising:
setting a predicted bug increase, and
calculating the bug-fixed score according to the predicted bug increase.

5. The method for evaluating software development according to claim 4, further comprising:
calculating a bonus at a first sprint according to the predicted bug increase and actual bug increase; and
contributing the bonus to a second sprint.

6. The method for evaluating software development according to claim 1, wherein
the parameters include the bug-fixed score, the SLO-enhancement score, the on-time score and the stability score.

7. A system for evaluating software development, comprising:
at least a processor and a memory;
a parameter selecting unit, using the processor and the memory, configured to select a plurality of parameters;

a calculating unit, using the processor and the memory, configured to calculate overall product achievement rate according to the parameters; and a receiving unit, using the processor and the memory, configured to obtain completion rate for each team and on-time score for each team;

wherein the calculating unit, using the processor and the memory, is further configured to calculate team product achievement rate for each team according to the completion rate for each team, the on-time score for each team and the overall product achievement rate, and the parameters include bug-fixed score and at least one of the following scores: SLO-enhancement score, the on-time score and stability score.

8. A non-transitory computer-readable medium storing one or more programs for causing a user terminal to realize the functions of:

causing a plurality of parameters to be selected;

causing overall product achievement rate to be calculated according to the parameters;

obtaining completion rate for each team and on-time score for each team; and calculating team product achievement rate for each team according to the completion rate for each team, the on-time score for each team and the overall product achievement rate, wherein the parameters include bug-fixed score and at least one of the following scores: SLO-enhancement score, the on-time score and stability score.

* * * * *